US012294828B2

(12) United States Patent
Takubo

(10) Patent No.: US 12,294,828 B2
(45) Date of Patent: May 6, 2025

(54) WIRELESS EARPHONE

(71) Applicant: Audio-Technica Corporation, Tokyo (JP)

(72) Inventor: Yosuke Takubo, Kanagawa (JP)

(73) Assignee: Audio-Technica Corporation, Tokyo (JP)

( * ) Notice: Subject to any disclaimer, the term of this patent is extended or adjusted under 35 U.S.C. 154(b) by 272 days.

(21) Appl. No.: 18/042,910

(22) PCT Filed: May 19, 2021

(86) PCT No.: PCT/JP2021/018929
§ 371 (c)(1),
(2) Date: Feb. 24, 2023

(87) PCT Pub. No.: WO2022/054340
PCT Pub. Date: Mar. 17, 2022

(65) Prior Publication Data

US 2023/0300515 A1 Sep. 21, 2023

(30) Foreign Application Priority Data

Sep. 9, 2020 (JP) ................................ 2020-151488

(51) Int. Cl.
*A61F 11/06* (2006.01)
*G10K 11/16* (2006.01)
(Continued)

(52) U.S. Cl.
CPC ..... *H04R 1/1075* (2013.01); *G10K 11/17823* (2018.01); *G10K 11/17873* (2018.01);
(Continued)

(58) Field of Classification Search
CPC .. H04R 1/1075; H04R 1/1016; H04R 1/1041; G10K 11/17823; G10K 11/17873
See application file for complete search history.

(56) References Cited

U.S. PATENT DOCUMENTS

2010/0296668 A1 11/2010 Lee et al.
2012/0020485 A1 1/2012 Visser et al.
(Continued)

FOREIGN PATENT DOCUMENTS

CN 105025418 A 11/2015
JP 2012-524917 A 10/2012

OTHER PUBLICATIONS

"Soundcore Life P2" web page, <https://www.ankerjapan.com/item/A3919.html>, 10 pages, retrieved from Anker Japan on Aug. 26, 2020.

(Continued)

*Primary Examiner* — Simon King
(74) *Attorney, Agent, or Firm* — WCF IP

(57) ABSTRACT

Provided is to achieve high call quality and improve wearability.

A wireless earphone 1 includes a driver unit (50), a first microphone (80), a second microphone (90), and a housing (10) that accommodates the driver unit (50), the first microphone (80), and the second microphone (90). The housing (10) includes a first accommodating portion (13) that accommodates the first microphone (80), a second accommodating portion (14) that accommodates the second microphone (90), and a main body (11) that is connected to each of the first accommodating portion (13) and the second accommodating portion (14). The first accommodating portion (13) is projectingly provided from the main body (11). The second accommodating portion (14) is projectingly provided from the main body (11) in a direction different from a projecting direction of the first accommodating portion (13).

12 Claims, 5 Drawing Sheets

(51) Int. Cl.

| | |
|---|---|
| ***G10K 11/178*** | (2006.01) |
| ***H03B 29/00*** | (2006.01) |
| ***H04R 1/10*** | (2006.01) |
| ***H04R 1/40*** | (2006.01) |
| ***H04R 3/00*** | (2006.01) |

(52) U.S. Cl.

CPC ......... *H04R 1/1016* (2013.01); *H04R 1/1041* (2013.01); *H04R 1/1083* (2013.01); *H04R 1/406* (2013.01); *H04R 3/005* (2013.01); *G10K 2210/1081* (2013.01); *G10K 2210/3027* (2013.01); *H04R 2201/107* (2013.01); *H04R 2420/07* (2013.01); *H04R 2460/01* (2013.01)

(56) References Cited

U.S. PATENT DOCUMENTS

| | | | |
|---|---|---|---|
| 2015/0245129 A1 | 8/2015 | Dusan et al. | |
| 2016/0050474 A1 | 2/2016 | Rye et al. | |
| 2017/0078784 A1 | 3/2017 | Rye et al. | |
| 2018/0115839 A1 | 4/2018 | Eichfeld et al. | |
| 2018/0184191 A1 | 6/2018 | Kim et al. | |
| 2019/0110120 A1 | 4/2019 | Sapozhnykov et al. | |
| 2019/0189144 A1 | 6/2019 | Dusan | |
| 2019/0231253 A1 | 8/2019 | Ahmed et al. | |
| 2020/0100018 A1 | 3/2020 | Solbach | |
| 2020/0184057 A1* | 6/2020 | Mukund | G06F 21/44 |
| 2021/0014594 A1* | 1/2021 | Kosaka | H04R 1/105 |

OTHER PUBLICATIONS

“AirPods” web page, <https://www.apple.com/jp/airpods-2nd-generation/>, 10 pages, retrieved from Apple Japan on Aug. 26, 2020.

* cited by examiner

WIRELESS EARPHONE

TECHNICAL FIELD

The present invention relates to a wireless earphone.

BACKGROUND ART

One type of earphone is a wireless type earphone (hereinafter referred to as "wireless earphone") that does not have a cord for connecting the earphone to a sound source. The wireless earphone includes a pair of left and right sound emitting units. The wireless earphone receives an audio signal from a sound source such as a portable music player via a wireless communication line such as Bluetooth (registered trademark), for example. The wireless earphone includes a wireless earphone in which the left and right sound emitting units are connected by a cable and a so-called complete wireless earphone in which the left and right sound emitting units are completely independent (the left and right sound emitting units are not connected by a cable).

Some wireless earphones include a wireless earphone with a hands-free call function.

The hands-free call function is a function capable of talking on a phone without holding a smartphone by hand when a user of the wireless earphone (hereinafter referred to as "user") makes a phone call with the smartphone while the wireless earphone is connected to the smartphone via a wireless communication line, for example. This function allows the user to respond a phone call by using a button operation of the wireless earphone, for example, without taking out the smartphone from a pocket or a bag. Thus, the user can enjoy talking on a phone while doing housework or working without both hands occupied.

The wireless earphone with the hands-free call function includes a housing, a microphone, and a driver unit.

The housing accommodates the microphone and the driver unit.

The microphone picks up a sound wave from a sound source (e.g., a person talking on a phone in a hands-free manner and hereinafter referred to as "calling person").

The driver unit generates an electrical signal (an audio signal) corresponding to the sound wave picked up by the microphone. The audio signal generated by the driver unit is input to the smartphone via the wireless communication line. Thus, the calling person can talk on a phone in the hands-free manner by using the wireless earphone.

High call quality is required for the hands-free call. The high call quality is achieved by delivering only the voice of the calling person to the other party of the call without including noise outside the housing (hereinafter referred to as "external noise"). One of the techniques for achieving the high call quality is a technique in which a plurality of microphones is utilized and beamforming is applied (hereinafter referred to as "beamforming technique").

The beamforming technique is a technique for separating and picking up only sounds in a specific direction to avoid unwanted sounds from being mixed in and obtaining a necessary target sound (hereinafter referred to as "target sound"). A plurality of (e.g., two) microphones for beamforming are used in the beamforming technique. The beamforming technique determines from which direction a transmitted voice of a calling person or external noise reaches based on sounds picked up by each microphone, forms a directivity by signal processing of the sound by using a time difference of the sounds reaching each microphone, and amplifies or attenuates a specific sound. Thus, the external noise, which is unwanted sound, is attenuated among the voice of the calling person and the external noise, and the voice of the calling person (hereinafter referred to as "transmitted voice") is amplified, thereby delivering the transmitted voice to the other party of the call. Thus, a clear voice call can be achieved. As a result, the wireless earphone equipped with the beamforming technique has high call quality in a hands-free communication (for example, see NPL 1 and 2).

CITATION LIST

Non Patent Literature

[NPL 1] Soundcore Life P2, [online]. Anker, [retrieved on 2020-08-26]. Retrieved from <https://www.ankerjapan-.com/item/A3919.html>.

[NPL 2] AirPods, [online]. Apple, [retrieved on 2020-08-26]. Retrieved from <https://www.apple.com/jp/airpods-2nd-generation/>

Each of the wireless earphone (complete wireless earphone) disclosed in NPL 1 and 2 includes a housing, two microphones for beamforming (a first microphone and a second microphone), and a driver unit. The housing includes a main body and a projecting portion projectingly provided from the main body. The driver unit is accommodated in the main body. The first microphone is accommodated in the main body. The second microphone is accommodated at the tip side (the opposite side to the main body) in the projecting portion.

Herein, in order to form a specific directivity by using the beamforming technique, a certain distance is required between the microphones. In order to dispose the second microphone at a position away from the first microphone, the length of the projecting portion needs to be increased as in the wireless earphones disclosed in NPL 1 and 2.

Thus, as to the wireless earphones disclosed in NPL 1 and 2, in a state in which the wireless earphone is worn on an ear of a user (hereinafter referred to as "worn state"), the tip side of the projecting portion protrudes from the ear of the user. When the projecting portion protrudes from the ear of the user, the wearing comfort deteriorates due to the weight of the projecting portion. The shape in which the tip side of the projecting portion protrudes from the ear of the user impairs the design of the wireless earphone.

SUMMARY OF INVENTION

Technical Problem

An object of the present invention is to achieve high call quality and improve wearability.

Solution to Problem

A wireless earphone according to the present invention includes: a driver unit; a first microphone; a second microphone; and a housing that accommodates the driver unit, the first microphone, and the second microphone, in which the housing includes a first accommodating portion that accommodates the first microphone, a second accommodating portion that accommodates the second microphone, and a main body that is connected to each of the first accommodating portion and the second accommodating portion, the first accommodating portion is projectingly provided from the main body, and the second accommodating portion is projectingly provided from the main body in a direction different from a projecting direction of the first accommodating portion.

Advantageous Effects of Invention

The present invention is able to achieve high call quality and improve wearability.

DESCRIPTION OF EMBODIMENTS

A wireless earphone according to the present invention will be described by the following embodiments and drawings.

Wireless Earphone

Configuration of Wireless Earphone

Figure 1:
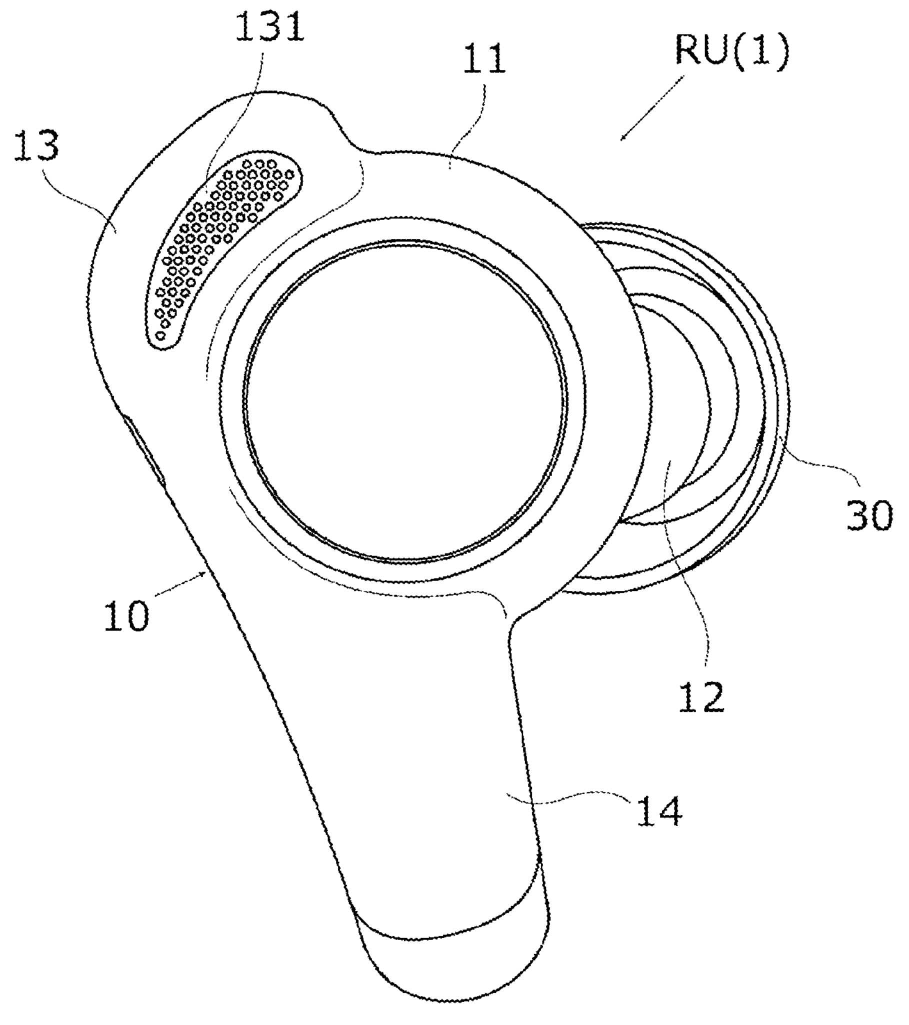
FIG. 1 is a front view of a wireless earphone illustrating an embodiment of the wireless earphone according to the present invention.

FIG. 1 is a front view of the wireless earphone illustrating an embodiment of the wireless earphone according to the present invention.

Figure 2:
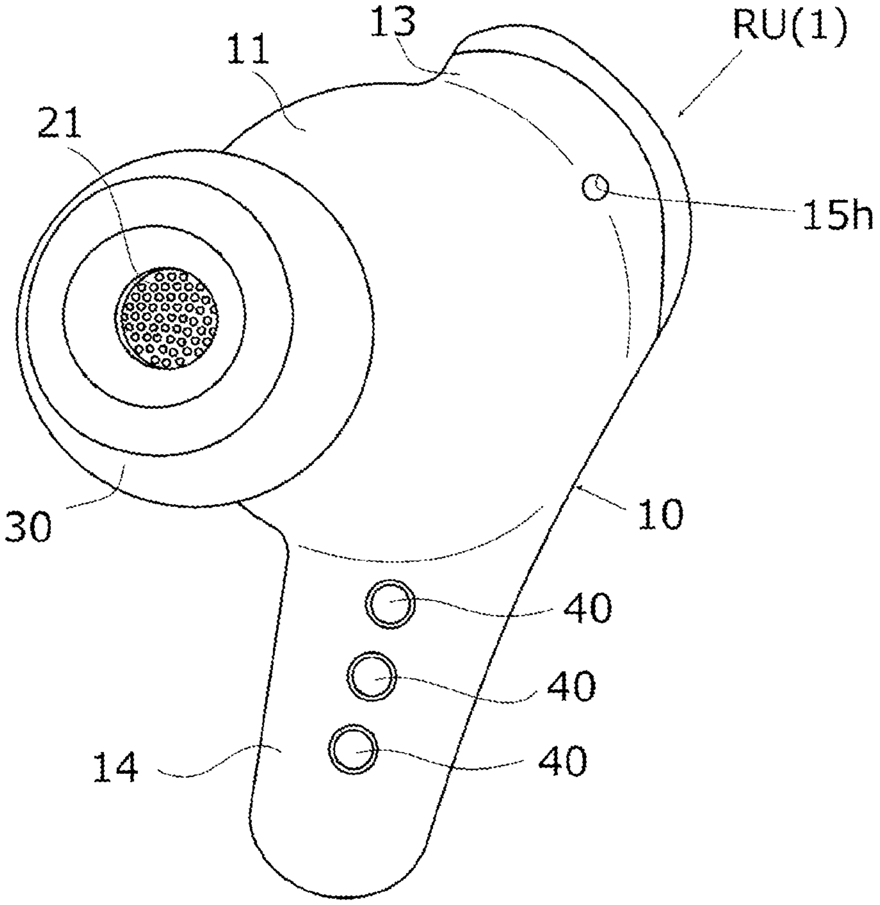
FIG. 2 is a rear view of the wireless earphone in FIG. 1.

FIG. 2 is a rear view of the wireless earphone in FIG. 1.

In the following description, the front of a wireless earphone 1 is a direction toward the head side of a user (back side in FIG. 1, front side in FIG. 2) in a state in which the user of the wireless earphone 1 (hereinafter referred to as "user") wears the wireless earphone 1 on the ear (hereinafter referred to as "worn state"). The rear of the wireless earphone 1 is a direction opposite to the direction toward the head side of the user (front side in FIG. 1, back side in FIG. 2) in the worn state.

The wireless earphone 1 is worn on the ear of the user and outputs a sound wave corresponding to an audio signal from a sound source (not illustrated) such as a portable device including a smartphone, a tablet device, and the like, and the wireless earphone 1 also outputs an audio signal corresponding to a voice (a sound wave) of the user to the portable device. The wireless earphone 1 inputs and outputs (transmits and receives) the audio signal to and from the portable device via a wireless communication line such as Bluetooth (registered trademark), for example.

The wireless earphone 1 includes a right sound emitting unit RU and a left sound emitting unit (not illustrated). The wireless earphone 1 is a so-called complete wireless earphone in which the right sound emitting unit RU and the left sound emitting unit are completely independent without being connected by a cable or the like.

A configuration of the right sound emitting unit RU is common to that of the left sound emitting unit. Thus, in the following description, the configuration of the right sound emitting unit RU will be described as an example, and the description of the configuration of the left sound emitting unit will be omitted.

Figure 3:
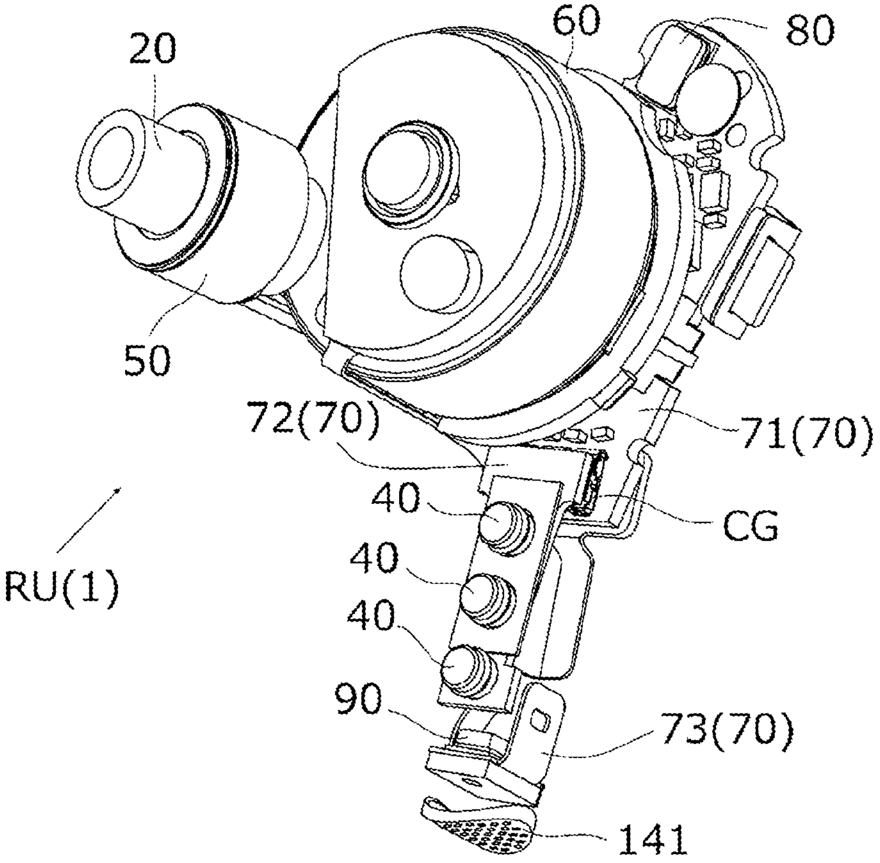
FIG. 3 is a partially exploded perspective view of the wireless earphone in FIG. 2.

FIG. 3 is a partially exploded perspective view of the wireless earphone in FIG. 2.

Figure 4:
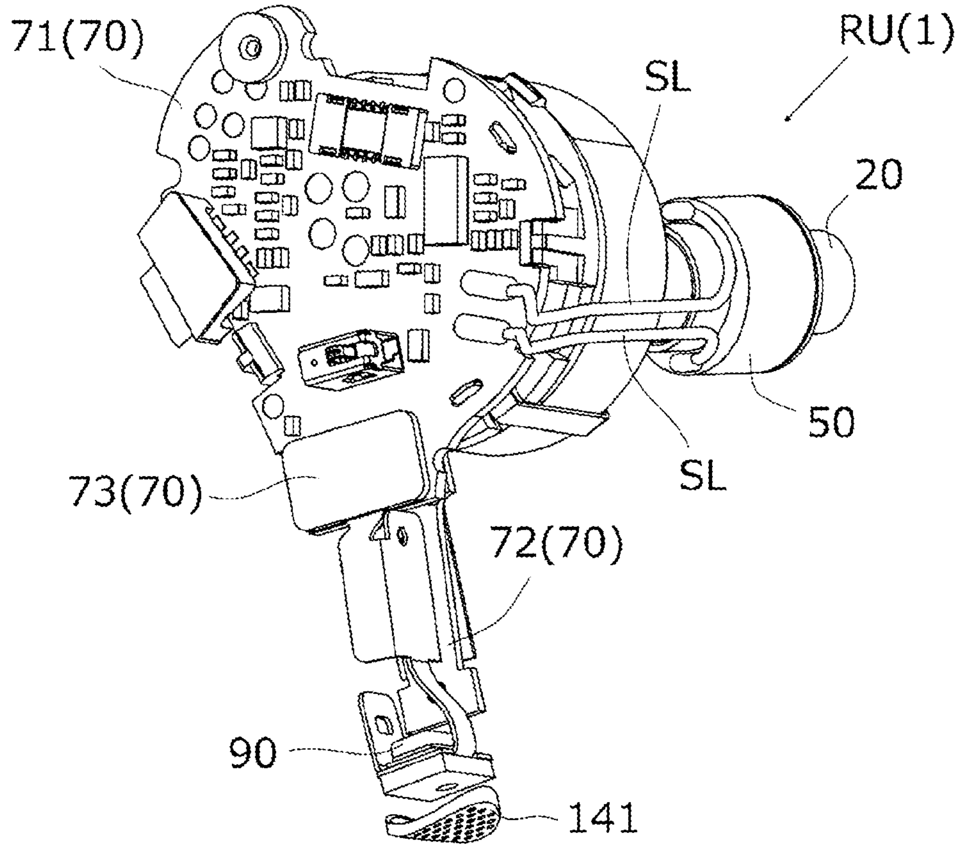
FIG. 4 is a partially exploded perspective view of the wireless earphone in FIG. 1.

FIG. 4 is a partially exploded perspective view of the wireless earphone in FIG. 1.

The following description refers to both FIG. 1 and FIG. 2.

The right sound emitting unit RU is worn on the right ear of the user and outputs a sound wave corresponding to an audio signal from a portable device, and the right sound emitting unit RU also outputs an audio signal corresponding to a voice (a sound wave) of the user to the portable device. The right sound emitting unit RU includes a housing 10, a sound conduit 20, an earpiece 30, a terminal group 40, a driver unit 50, a battery 60, a circuit board 70, a first microphone 80, and a second microphone 90.

The housing 10 accommodates the sound conduit 20, the driver unit 50, the battery 60, the circuit board 70, the first microphone 80, and the second microphone 90. The housing 10 is made of synthetic resin such as acrylonitrile-butadiene-styrene (ABS) resin, for example. The housing 10 includes a battery accommodating portion 11, a driver accommodating portion 12, a first accommodating portion 13, a second accommodating portion 14, and an external communication hole 15*h*.

The battery accommodating portion 11 accommodates the battery 60. The battery accommodating portion 11 is an example of the main body in the present invention.

The driver accommodating portion 12 accommodates the driver unit 50. The driver accommodating portion 12 is disposed on the front of the battery accommodating portion 11 and projectingly provided forward from the battery accommodating portion 11. An internal space of the driver accommodating portion 12 (hereinafter referred to as "internal space") communicates with an internal space of the battery accommodating portion 11.

The first accommodating portion 13 accommodates the first microphone 80. The first accommodating portion 13 is disposed at a position further rear than the battery accommodating portion 11 and projectingly provided upward (upside in FIG. 1) from the battery accommodating portion 11. That is, the direction in which the first accommodating portion 13 is projectingly provided from the battery accommodating portion 11 is different from the direction in which the driver accommodating portion 12 is projectingly provided from the battery accommodating portion 11. The internal space of the first accommodating portion 13 communicates with the internal space of the battery accommodating portion 11. The first accommodating portion 13 includes a first sound pickup portion 131. The first accommodating portion 13 includes a surface on which the first sound pickup portion is disposed. This surface is an opposing surface in the present invention. All or a part of this surface opposes an antihelix of the ear of the user when the wireless earphone 1 is used.

The first sound pickup portion 131 allows the outside and the inside (the internal space) of the first accommodating portion 13 to communicate with each other. The first sound pickup portion 131 is a mesh-like portion. The first sound pickup portion 131 is disposed at the opposite side to the driver accommodating portion 12 (at a position further rear than the battery 60) on the first accommodating portion 13, and the first sound pickup portion 131 is also disposed opposing a sound pickup surface of the first microphone 80. That is, the first sound pickup portion 131 is a mesh-like hole for picking up sounds of the first microphone 80.

The second accommodating portion 14 accommodates the second microphone 90. The second accommodating portion 14 is disposed at a position further rear than the battery accommodating portion 11 and projectingly provided downward (downside in FIG. 1) from the battery accommodating portion 11. That is, the direction in which the second accommodating portion 14 is projectingly provided from the battery accommodating portion 11 is different from the direction in which the driver accommodating portion 12 is projectingly provided from the battery accommodating portion 11 and the direction in which the first accommodating portion 13 is projectingly provided from the battery accommodating portion 11. The second accommodating portion 14 has a substantially cylindrical shape. The internal space of the second accommodating portion 14 communicates with the internal space of the battery accommodating portion 11. The second accommodating portion 14 includes a second sound pickup portion 141.

The second sound pickup portion 141 allows the outside and the inside (the internal space) of the second accommodating portion 14 to communicate with each other. The second sound pickup portion 141 is a mesh-like portion. The second sound pickup portion 141 is disposed opposing the second microphone 90. The second sound pickup portion 141 is disposed closer to the mouth side of the user than the first sound pickup portion 131 in the worn state. That is, the second sound pickup portion 141 is a mesh-like hole for picking up sounds of the second microphone 90.

The internal space of the first accommodating portion 13 communicates with the internal space of the second accommodating portion 14 via the internal space of the battery accommodating portion 11. That is, the internal space of the driver accommodating portion 12, an accommodating space of the battery accommodating portion 11, an accommodating space of the first accommodating portion 13, and the internal space of the second accommodating portion 14 communicate with one another.

The external communication hole 15*h* allows the internal space of the housing 10 and a space outside the housing 10 (hereinafter referred to as "external space") to communicate with each other. The external communication hole 15*h* inhibits an increase in pressure in the internal space of the housing 10, which is generated when the right sound emitting unit RU is worn on the right ear RE of the user (when worn on an auricle the user) (see FIG. 5), and prevents damage to the driver unit 50 (e.g., damage to a diaphragm (not illustrated) included in the driver unit 50). The external communication hole 15*h* is disposed near the boundary between the battery accommodating portion 11 and the first accommodating portion 13.

The sound conduit 20 guides the sound wave from the driver unit 50 to an external auditory canal of the user when the wireless earphone 1 is used. The sound conduit 20 has a substantially cylindrical shape. The sound conduit 20 is disposed on the front of the driver unit 50. The sound conduit 20 includes a sound emitting portion 21.

The sound emitting portion 21 covers the tip (front end) of the sound conduit 20 and allows the outside and the inside of the sound conduit 20 to communicate with each other. The sound emitting portion 21 is a mesh-like portion. The sound emitting portion 21 is disposed opposing a sound emitting surface of the driver unit 50.

The earpiece 30 comes into close contact with the inner wall of the external auditory canal of the user in the worn state. The earpiece 30 is attached to the outer periphery of the sound conduit 20. The earpiece 30 is made of an elastic material such as silicone rubber, for example. The earpiece 30 has a substantially double cylindrical shape in which a front end side is folded back in a U shape in the cross-sectional view.

The terminal group 40 is a set of terminals including a terminal for receiving power to be charged in the battery 60 from a charger (not illustrated) and a terminal for transmitting a signal indicating remaining power of the battery 60 to the charger side. The terminal group 40 is disposed in the second accommodating portion with a part thereof exposed from the second accommodating portion 14.

The driver unit 50 outputs the sound wave corresponding to the audio signal from a sound source (not illustrated) such as a portable device. Furthermore, the driver unit 50 outputs a sound wave (a cancelling sound) corresponding to a cancelling signal from an NC circuit described later. That is, the driver unit 50 outputs the sound wave corresponding to the audio signal and the sound wave corresponding to the cancelling signal. The driver unit 50 is a dynamic electroacoustic transducer, for example. The driver unit 50 is disposed in the internal space of the driver accommodating portion 12 (accommodated in the driver accommodating portion 12).

The battery 60 supplies power for driving various electronic circuits attached to the circuit board 70 to the various electronic circuits. The battery 60 is a button-type small battery, for example. The battery 60 is disposed in the internal space of the battery accommodating portion 11 (accommodated in the battery accommodating portion 11). That is, the battery 60 is disposed at the rear of the driver unit 50.

The circuit board 70 is a board to which an electronic circuit such as a noise-cancelling circuit (hereinafter referred to as "NC circuit") (not illustrated), the first microphone 80, the second microphone 90, and each terminal of the terminal group 40 are attached (mounted). The circuit board 70 is disposed in the internal space of the housing 10. The circuit board 70 is a printed circuit board (PCB), for example. The circuit board 70 is connected to the driver unit 50 via a signal line SL. The circuit board 70 includes a first circuit board 71, a second circuit board 72, and a third circuit board 73.

The first circuit board 71 mounts the electronic circuit such as the NC circuit and the first microphone 80 thereon. The first circuit board 71 is disposed from the battery accommodating portion 11 to the first accommodating portion 13 (accommodated in the battery accommodating portion 11 and the first accommodating portion 13).

The NC circuit generates the cancelling signal based on a noise signal corresponding to the external noise of the housing 10 picked up by the first microphone 80. The cancelling signal generated by the NC circuit is input to the driver unit 50.

The second circuit board 72 mounts the terminal group 40 thereon. The second circuit board 72 is connected to the first circuit board 71 via a first connector guide CG. The second circuit board 72 is disposed in the internal space of the second accommodating portion 14 (accommodated in the second accommodating portion 14).

The third circuit board 73 mounts the second microphone 90 thereon. The third circuit board 73 is connected to the first circuit board 71 via a second connector guide (not illustrated). The third circuit board 73 is disposed in the internal space of the second accommodating portion 14 (accommodated in the second accommodating portion 14).

The first microphone 80 implements a noise-cancelling function and a beamforming function performed in cooperation with the second microphone 90. The first microphone 80 is a micro electro mechanical systems (MEMS) microphone, for example. The first microphone 80 is disposed in the internal space of the first accommodating portion 13 (accommodated in the first accommodating portion 13). That is, the first microphone 80 is disposed above the driver unit 50. Furthermore, in the worn state, the first microphone 80 is disposed at a position farther away from the mouth of the user (calling person) than the second microphone 90. The first microphone 80 is mounted on the front surface (surface on the front side) of the circuit board 70 (the first circuit board 71) in the internal space of the first accommodating portion 13 with the sound pickup surface facing toward the first circuit board 71. A sound pickup hole (not illustrated) is disposed on the sound pickup surface, and the first microphone 80 picks up the external noise of the housing 10 and a transmitted voice of the calling person via a through hole (not illustrated) of the first circuit board 71 and the first sound pickup portion 131.

When the first microphone 80 implements the noise-cancelling function, the first microphone 80 picks up the external noise of the housing 10 via the first sound pickup portion 131 and generates a noise signal corresponding to the external noise. The first microphone 80 is connected to the NC circuit mounted on the circuit board 70 via a signal line (not illustrated).

When the first microphone 80 implements the beamforming function in cooperation with the second microphone 90, the first microphone 80 picks up the transmitted voice of the calling person talking on a phone in a hands-free manner and the external noise. As described above, the first microphone 80 is disposed at a position farther away from the mouth of the user (calling person) than the second microphone 90. Accordingly, a time for the voice of the calling person to reach the second microphone 90 is shorter than a time for the voice of the calling person to reach the first microphone 80. Thus, the direction of the sound source with respect to the right sound emitting unit RU is identified. The second microphone 90 functions as a microphone for a hands-free call. The first microphone 80 functions as a microphone for beamforming correction. Thus, the transmitted voice and the external noise picked up by the first microphone 80 are attenuated.

The second microphone 90 implements the beamforming function in cooperation with the first microphone 80. The second microphone 90 picks up the transmitted voice of the calling person talking on the phone in the hands-free manner. The second microphone 90 is the MEMS microphone, for example.

The second microphone 90 is disposed in the internal space of the second accommodating portion 14 (accommodated in the second accommodating portion 14). That is, the second microphone 90 is disposed below the driver unit 50. In the worn state, the second microphone 90 is disposed closer to the mouth of the user (calling person) than the first microphone 80.

The second microphone 90 is mounted on the circuit board 70 (the third circuit board 73) in the internal space of the second accommodating portion 14 with a sound pickup surface facing toward the third circuit board 73. A sound pickup hole (not illustrated) is disposed on the sound pickup surface, and the second microphone 90 picks up the transmitted voice of the calling person via a through hole (not illustrated) of the third circuit board 73 and the second sound pickup portion 141.

As described above, the second microphone 90 is disposed at a position closer to the mouth of the user (calling person) than the first microphone 80. Furthermore, the time for the voice of the calling person to reach the second microphone 90 is shorter than the time for the voice of the calling person to reach the first microphone 80. Thus, as described above, the second microphone 90 functions as the microphone for the hands-free call. As a result, the transmitted voice picked up by the second microphone 90 is amplified.

The first microphone 80 and the second microphone 90 that implement the beamforming function allow the voice of the calling person to be delivered to the other party of the call without including the external noise among the voice of the calling person and the external noise, thereby implementing a clear voice call. As a result, the wireless earphone 1 is able to achieve high call quality in the hands-free call.

In this way, the wireless earphone 1 includes the "beamforming function", the "noise-cancelling function", and the "hands-free call function".

Figure 5:
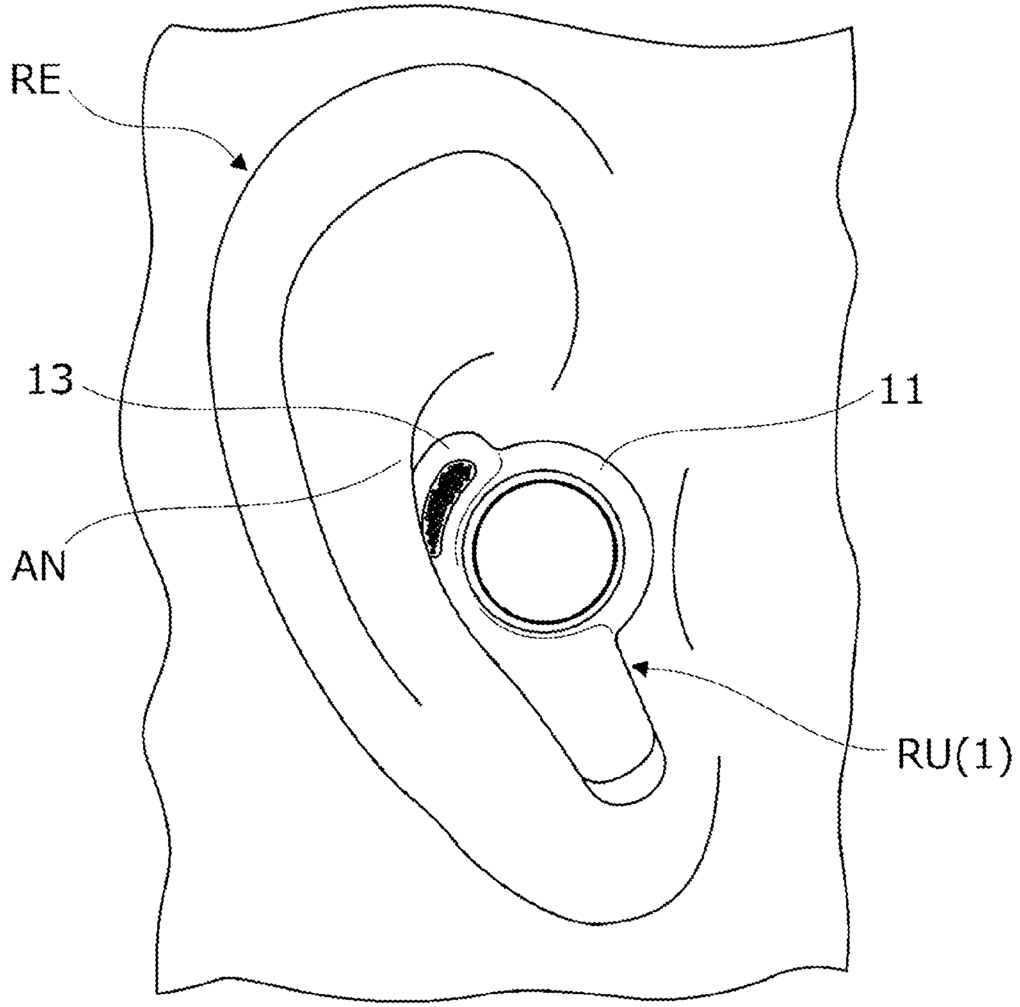
FIG. 5 is a schematic diagram illustrating a state in which the wireless earphone in FIG. 1 is worn on a user.

FIG. 5 is a schematic diagram illustrating a worn state of the wireless earphone 1.

The figure illustrates a state in which the right sound emitting unit RU is worn on the right ear RE of the user.

The right sound emitting unit RU is worn on the right ear RE of the user when the wireless earphone 1 is used. In this case, the earpiece (see FIG. 2) and a part of the sound conduit (see FIG. 3) are disposed in the cavity of concha. A part (a part of the outer edge) of the first accommodating portion 13 projectingly provided upward from the battery accommodating portion 11 comes into contact with an antihelix AN (hooked on the antihelix AN).

When the part of the first accommodating portion 13 is in contact with the antihelix AN (when the part is hooked on the antihelix AN), a part of the first accommodating portion 13 where the first microphone 80 (not illustrated in FIG. 5) is disposed does not contact the antihelix AN (the part is not hooked on the antihelix AN).

CONCLUSION

According to the embodiment described above, the housing 10 includes the first accommodating portion 13 projectingly provided upward from the battery accommodating portion 11. Thus, in the worn state of the wireless earphone 1, a part of the first accommodating portion 13 comes into contact with the antihelix AN (hooked on the antihelix AN). As a result, the wireless earphone 1 provides the user with a stable wearing comfort in the worn state.

In the worn state of the wireless earphone 1, even in a state in which a part of the first accommodating portion 13 is in contact with the antihelix AN (hooked on the antihelix AN), a part of the first accommodating portion 13 where the first microphone 80 is disposed does not contact the antihelix AN (this part is not hooked on the antihelix AN). Thus, the first microphone 80 is not affected by picking up sounds such as the external noise.

According to the embodiment described above, the first microphone 80 is accommodated in the first accommodating portion 13 projectingly provided upward from the battery accommodating portion 11, and the second microphone 90 is accommodated in the second accommodating portion 14 projectingly provided downward from the battery accommodating portion 11. Accordingly, the distance between the first microphone 80 and the second microphone 90 required for beamforming (e.g., 20 mm or more) can be provided. Thus, the wireless earphone 1 is able to execute the beamforming function without deteriorating the beamforming function. As a result, the wireless earphone 1 is able to achieve high call quality in the hands-free call.

Since the first microphone 80 is disposed at a position projectingly provided from the battery accommodating portion 11, the length of the second accommodating portion 14 need not be longer than necessary unlike the wireless earphones disclosed in NPL 1 and 2 (hereinafter referred to as “conventional wireless earphone”). As a result, the wireless earphone 1 can shorten the length of the second accommodation portion (the projecting portion of the conventional wireless earphone) as compared with the conventional wireless earphone. That is, in the worn state of the wireless earphone 1, the projecting amount of the second accommodating portion 14 protruding from the ear of the user decreases. Thus, the wireless earphone 1 provides the user with a stable wearing comfort.

As described above, the configuration of the left sound emitting unit of the wireless earphone 1 is common to the configuration of the right sound emitting unit RU. That is, the left sound emitting unit includes the housing, the sound conduit, the earpiece, the terminal group, the driver unit, the battery, the circuit board, the first microphone, and the second microphone.

Although the description is omitted, the right sound emitting unit and the left sound emitting unit may be configured with a so-called “relay transmission method” or may be configured with a so-called “left and right independent reception method”. That is, for example, when the right sound emitting unit and the left sound emitting unit are configured with the “relay transmission method”, the left sound emitting unit receives a voice signal from the right sound emitting unit, and the driver unit of the left sound emitting unit outputs a sound wave based on the audio signal. When the right sound emitting unit and the left sound emitting unit are configured with the “left and right independent reception method”, the configuration and operation of the left sound emitting unit is the same as the configuration and operation of the right sound emitting unit described above.

Although the description is omitted, when the right sound emitting unit and the left sound emitting unit are worn on the ears of the user, only the first microphone of the right sound emitting unit picks up a transmitted voice of a calling person. That is, the microphone of the left sound emitting unit is controlled so as not to pick up the transmitted voice of the calling person.

Note that the first microphone for picking up the transmitted voice of the calling person may be the first microphone of the left sound emitting unit. That is, for example, only the first microphone of the left sound emitting unit picks up the transmitted voice of the calling person, and the microphone of the right sound emitting unit is controlled so as not to pick up the transmitted voice of the calling person.

The operation of the first microphone to pick up the transmitted voice of the calling person may be determined depending on the remaining power of the battery of the right sound emitting unit and the remaining power of the battery of the left sound emitting unit. That is, for example, when the remaining power of the battery of the right sound emitting unit is large, the first microphone of the right sound emitting unit picks up the transmitted voice of the calling person, and the microphone of the left sound emitting unit is controlled so as not to pick up the transmitted voice of the calling person.

REFERENCE SIGNS LIST

1 Wireless earphone
10 Housing
11 Battery accommodating portion
12 Driver accommodating portion
13 First accommodating portion
131 First sound pickup portion
14 Second accommodating portion
141 Second sound pickup portion
**15*h*** External communication hole
20 Sound conduit
21 Sound emitting portion
30 Earpiece
40 Terminal group
50 Driver unit
60 Battery
70 Circuit board
71 First circuit board
72 Second circuit board
73 Third circuit board
80 First microphone
90 Second microphone
RU Right sound emitting unit
CG First connector guide
RE Right ear
AN Antihelix

The invention claimed is:

1. A wireless earphone configured to be worn on an ear of a user, the wireless earphone comprising:
- a driver unit;
- a first microphone;
- a second microphone; and
- a housing that accommodates the driver unit, the first microphone, and the second microphone, wherein
- the housing includes:
  - a first accommodating portion that accommodates the first microphone;
  - a second accommodating portion that accommodates the second microphone; and
  - a main body that is connected to each of the first accommodating portion and the second accommodating portion,
- the first accommodating portion is projectingly provided from the main body and includes:
  - an opposing surface configured to oppose an antihelix of the user; and
  - a first sound pickup portion for sound pickup of the first microphone,
- the second accommodating portion is projectingly provided from the main body in a direction different from a projecting direction of the first accommodating portion,
- the first sound pickup portion is disposed on the opposing surface, and
- a part of an outer edge of the first accommodating portion comes into contact with the antihelix in a worn state of the wireless earphone.

2. The wireless earphone according to claim 1, further comprising a driver accommodating portion that accommodates the driver unit, wherein
- the driver accommodating portion is projectingly provided from the main body,
- the first accommodating portion is projectingly provided from the main body in a direction different from a projecting direction of the driver accommodating portion, and
- the second accommodating portion is projectingly provided from the main body in a direction different from the projecting direction of the driver accommodating portion and in a direction opposite to the projecting direction of the first accommodating portion.

3. The wireless earphone according to claim 2, wherein an internal space of the first accommodating portion communicates with an internal space of the second accommodating portion via an internal space of the main body.

4. The wireless earphone according to claim 1, wherein the second accommodating portion is projectingly provided toward a mouth side of a user in the worn state of the wireless earphone.

5. The wireless earphone according to claim 1, wherein the first accommodating portion is projectingly provided on an opposite side to the second accommodating portion in the worn state of the wireless earphone.

6. The wireless earphone according to claim 1, wherein
the second accommodating portion includes a second sound pickup portion for sound pickup of the second microphone, and
the second sound pickup portion is disposed on a mouth side of a user in the second accommodating portion in the worn state of the wireless earphone.

7. The wireless earphone according to claim 1, wherein the first microphone implements a beamforming function in cooperation with the second microphone.

8. The wireless earphone according to claim 1, wherein the driver unit outputs a cancelling sound for cancelling external noise picked up by the first microphone.

9. The wireless earphone according to claim 1, wherein
the first microphone includes a first sound pickup surface through which a first sound pickup hole is disposed,
the second microphone includes a second sound pickup surface through which a second sound pickup hole is disposed, and
a direction to which the first sound pickup surface is directed is different from a direction to which the second sound pickup surface is directed.

10. The wireless earphone according to claim 1, further comprising a first circuit board on which the first microphone is mounted, wherein
the first microphone includes a first sound pickup surface through which a first sound pickup hole is disposed,
the first accommodating portion includes a first sound pickup portion that allows an outside and an inside of the first accommodating portion to communicate with each other,
the first circuit board is disposed between the first microphone and the first sound pickup portion, and
the first microphone is mounted on the first circuit board with the first sound pickup surface facing toward the first circuit board.

11. The wireless earphone according to claim 10, further comprising a third circuit board on which the second microphone is mounted, wherein
the second microphone includes a second sound pickup surface through which a second sound pickup hole is disposed,
the second accommodating portion includes a second sound pickup portion that allows an outside and an inside of the second accommodating portion to communicate with each other,
the third circuit board is disposed between the second microphone and the second sound pickup portion, and
the second microphone is mounted on the third circuit board with the second sound pickup surface facing toward the third circuit board.

12. The wireless earphone according to claim 11, wherein a direction to which the first sound pickup surface is directed is different from a direction to which the second sound pickup surface is directed.

* * * * *